US008616409B2

(12) United States Patent
Young et al.

(10) Patent No.: US 8,616,409 B2
(45) Date of Patent: Dec. 31, 2013

(54) DEVICES FOR DISPENSING OBJECTS USEFUL IN SYSTEM AND METHOD FOR DISPENSING

(75) Inventors: Demetris P. Young, Durham, NC (US); Jody DuMond, Cary, NC (US); George Raymond Abrams, Cary, NC (US); Matthew P. Daniels, Pittsboro, NC (US)

(73) Assignee: Parata Systems, LLC, Durham, NC (US)

(*) Notice: Subject to any disclaimer, the term of this patent is extended or adjusted under 35 U.S.C. 154(b) by 233 days.

(21) Appl. No.: 12/015,007

(22) Filed: Jan. 16, 2008

(65) Prior Publication Data

US 2009/0179041 A1    Jul. 16, 2009

(51) Int. Cl.
*B65G 59/00* (2006.01)

(52) U.S. Cl.
USPC .............................. 221/167; 221/69; 221/277

(58) Field of Classification Search
USPC ............. 221/1, 4, 68, 92, 103, 119–122, 133, 221/156, 163, 167, 171–173, 175, 182–184, 221/197, 200, 202, 203, 208, 241, 258, 277, 221/282, 283, 285
See application file for complete search history.

(56) References Cited

U.S. PATENT DOCUMENTS

| | | | |
|---|---|---|---|
| 2,601,570 A | 6/1952 | Suthers | |
| 2,665,775 A | 1/1954 | Smith | |
| 2,708,996 A | 5/1955 | Skillman | |
| 2,748,914 A | 6/1956 | Day | |
| 2,865,532 A | 12/1958 | Smith | |
| 3,023,851 A | 3/1962 | Stiller | |
| 3,128,011 A * | 4/1964 | Bleiman | 221/68 |
| 3,144,958 A | 8/1964 | Gumpertz | |
| 3,160,793 A | 12/1964 | Colburn | |
| 3,179,288 A | 4/1965 | Davy | |
| 3,185,851 A | 5/1965 | D'Emilio | |
| 3,196,276 A | 7/1965 | Naab | |

(Continued)

FOREIGN PATENT DOCUMENTS

| | | |
|---|---|---|
| CA | 936 501 | 11/1973 |
| DE | 1481166 | 8/1970 |

(Continued)

OTHER PUBLICATIONS

International Search Report and Written Opinion for PCT/US2008/000031, dated May 15, 2008.

(Continued)

*Primary Examiner* — Gene Crawford
*Assistant Examiner* — Kelvin L Randall, Jr.
(74) *Attorney, Agent, or Firm* — Myers Bigel Sibley & Sajovec, P.A.

(57) ABSTRACT

A device for singulating open-ended objects includes: a housing configured to retain a plurality of open-ended objects, the housing having an open lower end; an outer ring positioned below the housing; a drum positioned within the outer ring to form a drum assembly, the drum including a hub having a substantially circular wall and a plurality of wings that extend radially outwardly from the wall to contact the outer ring, the hub, wings and outer ring forming a plurality of gaps; a mounting structure with an exit aperture fixed relative to the housing; and a rotary drive unit mounted to the drum that rotates the drum about an axis of rotation. The presence of the wings can enable the device to singulated caps more consistently.

22 Claims, 10 Drawing Sheets

(56) References Cited

U.S. PATENT DOCUMENTS

| | | |
|---|---|---|
| 3,206,062 A | 9/1965 | Rappaport |
| 3,298,569 A * | 1/1967 | Weitzman ............... 221/203 |
| 3,310,199 A | 3/1967 | Roberts |
| 3,312,372 A | 4/1967 | Cooper, Jr. |
| 3,410,450 A | 11/1968 | Fortenberry |
| 3,417,542 A | 12/1968 | Merrill |
| 3,436,736 A | 4/1969 | Platt |
| 3,556,342 A | 1/1971 | Guarr |
| 3,599,152 A | 8/1971 | Williams |
| 3,653,176 A | 4/1972 | Gess |
| 3,730,388 A | 5/1973 | Bender |
| 3,732,544 A | 5/1973 | Obland |
| 3,780,907 A | 12/1973 | Colburn |
| 3,815,780 A | 6/1974 | Bauer |
| 3,837,139 A | 9/1974 | Roseberg |
| 3,885,702 A | 5/1975 | Joslin |
| 3,917,045 A | 11/1975 | Williams |
| 4,267,942 A | 5/1981 | Wick |
| 4,434,602 A | 3/1984 | Culpepper |
| 4,546,901 A | 10/1985 | Buttarazzi |
| 4,573,606 A | 3/1986 | Lewis |
| 4,655,026 A | 4/1987 | Wigoda |
| 4,664,289 A | 5/1987 | Shimizu |
| 4,674,259 A | 6/1987 | Hills |
| 4,674,651 A | 6/1987 | Scidmore |
| 4,693,057 A | 9/1987 | Rittinger |
| 4,695,954 A | 9/1987 | Rose |
| 4,705,156 A | 11/1987 | Boling |
| 4,741,428 A | 5/1988 | Taniguchi et al. |
| 4,766,542 A | 8/1988 | Pilarczyk |
| 4,767,023 A | 8/1988 | Hackmann |
| 4,801,044 A | 1/1989 | Kubota et al. |
| 4,805,377 A | 2/1989 | Carter |
| 4,869,392 A | 9/1989 | Moulding, Jr. |
| 4,918,604 A | 4/1990 | Baum |
| 4,971,513 A | 11/1990 | Bergerioux |
| 4,980,292 A | 12/1990 | Elbert |
| 4,984,709 A | 1/1991 | Weinstein |
| 5,018,644 A | 5/1991 | Hackmann |
| 5,047,948 A | 9/1991 | Turner |
| 5,803,309 A * | 9/1998 | Yuyama et al. ............. 221/82 |
| 6,394,308 B1 * | 5/2002 | Yuyama et al. ............ 221/265 |
| RE37,829 E | 9/2002 | Charhut |
| 6,631,826 B2 | 10/2003 | Pollard et al. |
| 6,971,541 B2 | 12/2005 | Williams et al. |
| 6,971,544 B2 * | 12/2005 | Williams et al. .......... 221/167 |
| 7,581,658 B2 * | 9/2009 | Mosconi et al. ........... 221/161 |
| 2008/0029535 A1 * | 2/2008 | Kim ........................ 221/167 |

FOREIGN PATENT DOCUMENTS

| | | |
|---|---|---|
| DE | 26 59 287 A1 | 7/1978 |
| EP | 1 477 403 A | 11/2004 |
| GB | 1 168 758 | 10/1969 |
| GB | 1 411 951 | 10/1975 |
| JP | 51-000792 B | 1/1976 |
| JP | 52-047400 | 4/1977 |
| JP | 61-104904 A | 5/1986 |
| JP | 63-208410 A | 8/1988 |
| JP | 64-028102 A | 1/1989 |
| JP | 1-288265 A | 11/1989 |
| JP | 2-028417 A | 1/1990 |
| WO | WO 2005/087175 A | 9/2005 |

OTHER PUBLICATIONS

International Search Report and Written Opinion for PCT/US2009/000138, dated Apr. 14, 2009.

Examiner's Report for Canadian Application No. 2,706,554, mailed Feb. 3, 2012.

* cited by examiner

DEVICES FOR DISPENSING OBJECTS USEFUL IN SYSTEM AND METHOD FOR DISPENSING

FIELD OF THE INVENTION

The present invention is directed generally to the dispensing of prescriptions of pharmaceuticals, and more specifically is directed to the automated dispensing of caps for pharmaceutical vials.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacists tasks, automation of these tasks has been desirable.

Some attempts have been made to automate the pharmacy environment. Different exemplary approaches are shown in U.S. Pat. No. 5,337,919 to Spaulding et al. and U.S. Pat. Nos. 6,006,946; 6,036,812 and 6,176,392 to Williams et al. The Williams system conveys a bin with tablets to a counter and a vial to the counter. The counter dispenses tablets to the vial. Once the tablets have been dispensed, the system returns the bin to its original location and conveys the vial to an output device. Tablets may be counted and dispensed with any number of counting devices. Drawbacks to these systems typically include the relatively low speed at which prescriptions are filled and the absence in these systems of securing a cap (i.e., a lid) on the container after it is filled.

One additional automated system for dispensing pharmaceuticals is described in some detail in U.S. Pat. No. 6,971,541 to Williams et al. (hereinafter Williams '541). This system has the capacity to select an appropriate vial, label the vial, fill the vial with a desired quantity of a selected pharmaceutical tablet, apply a cap to the filled vial, and convey the labeled, filled, capped vial to an offloading station for retrieval.

Although this particular system can provide automated pharmaceutical dispensing, certain of the operations may be improved. For example, the device that dispenses caps includes a hopper with a circumferential groove or gap at its lower end that surrounds a rotatable central circular drum. The groove has a depth that is larger than the diameter of a cap and a width that is approximately the width of the cap. A circumferential rim juts radially inwardly from the wall of the hopper above the groove and drum. The sizes and configurations of the groove, drum and protrusion are such that a cap (which is a relatively flat, open-ended cylinder) can enter the groove from above only when the cap is oriented so that the open end of the cap faces the drum. This occurs because the open end of the cap can receive an arcuate portion of the edge of the drum, thereby allowing the cap to be positioned slightly closer to the wall (and, therefore, able to slide into the groove) than a cap oriented with the closed end facing the drum, which cannot pass between the drum and the rim in this manner. The floor of the hopper has an opening through which caps, once in the groove, can pass one at a time to a capping station.

Caps are dispensed by filling the bin with caps and rotating the drum. As the drum rotates, each cap tumbles until it eventually reaches the desired orientation and slides into the groove. As the drum continues to rotate, the cap eventually reaches the opening, at which point it passes through the opening and can pass to the capping station.

One issue that can occur with the Williams '541 system is the dispensing of multiple caps at once. In some circumstances, caps may have edge features (often associated with child-resistant caps) that can tangle or otherwise interlock at their edges, particularly when they are in an edge-stacked relationship while positioned in the groove. When this occurs, two interlocked caps may be dispensed at once. It would be desirable to address this behavior.

SUMMARY OF THE INVENTION

As a first aspect, embodiments of the present invention are directed to a device for singulating open-ended objects. The device comprises: a housing configured to retain a plurality of open-ended objects, the housing having an open lower end; an outer ring positioned below the housing; a drum fixed to and positioned within the outer ring to form a drum assembly, the drum including a hub having a substantially circular wall and a plurality of wings that extend radially outwardly from the wall to contact the outer ring, the hub, wings and outer ring forming a plurality of gaps; a mounting structure with an exit aperture fixed relative to the housing; and a rotary drive unit mounted to the drum that rotates the drum about an axis of rotation. The presence of the wings can enable the device to singulated caps more consistently.

As a second aspect, embodiments of the present invention are directed to a device for singulating open-ended objects, the device comprising, a housing configured to retain a plurality of open-ended objects, the housing having an open lower end; an outer ring positioned below the housing; a drum positioned within the outer ring to form a drum assembly, the drum including a hub having a substantially circular wall, the hub and outer ring forming at least one gap therebetween; a mounting structure with an exit aperture fixed relative to the housing; a rotary drive unit mounted to the drum that rotates the drum assembly about an axis of rotation; and separation structure mounted to the outer ring and positioned above the exit aperture at a height selected to enable a first object to pass beneath the separating structure and drop through the exit aperture but prevent a second object from dropping through the exit aperture. The presence of the singulation structure can enable the device to singulate vertically stacked or interlocked caps.

As a third aspect, embodiments of the present invention are directed to a method of singulating open-ended objects. The method comprises the steps of: (a) providing a drum assembly comprising an outer ring positioned below the housing and a drum positioned within the outer ring, the drum including a hub having a substantially circular wall, the hub and outer ring forming at least one gap therebetween, the drum assembly further including separation structure mounted on the outer ring and extending radially inwardly, the separation structure being positioned such that a first object can pass beneath the separation structure but a second object positioned above the first object cannot pass under the separation structure, the drum assembly being mounted on a mounting structure having a floor with an exit aperture; (b) feeding the drum assembly with objects; and (c) rotating the drum about an axis of rotation such that an object drops into a gap and passes below the separation structure and into the exit aperture.

DETAILED DESCRIPTION OF EMBODIMENTS OF THE INVENTION

Figure 1:
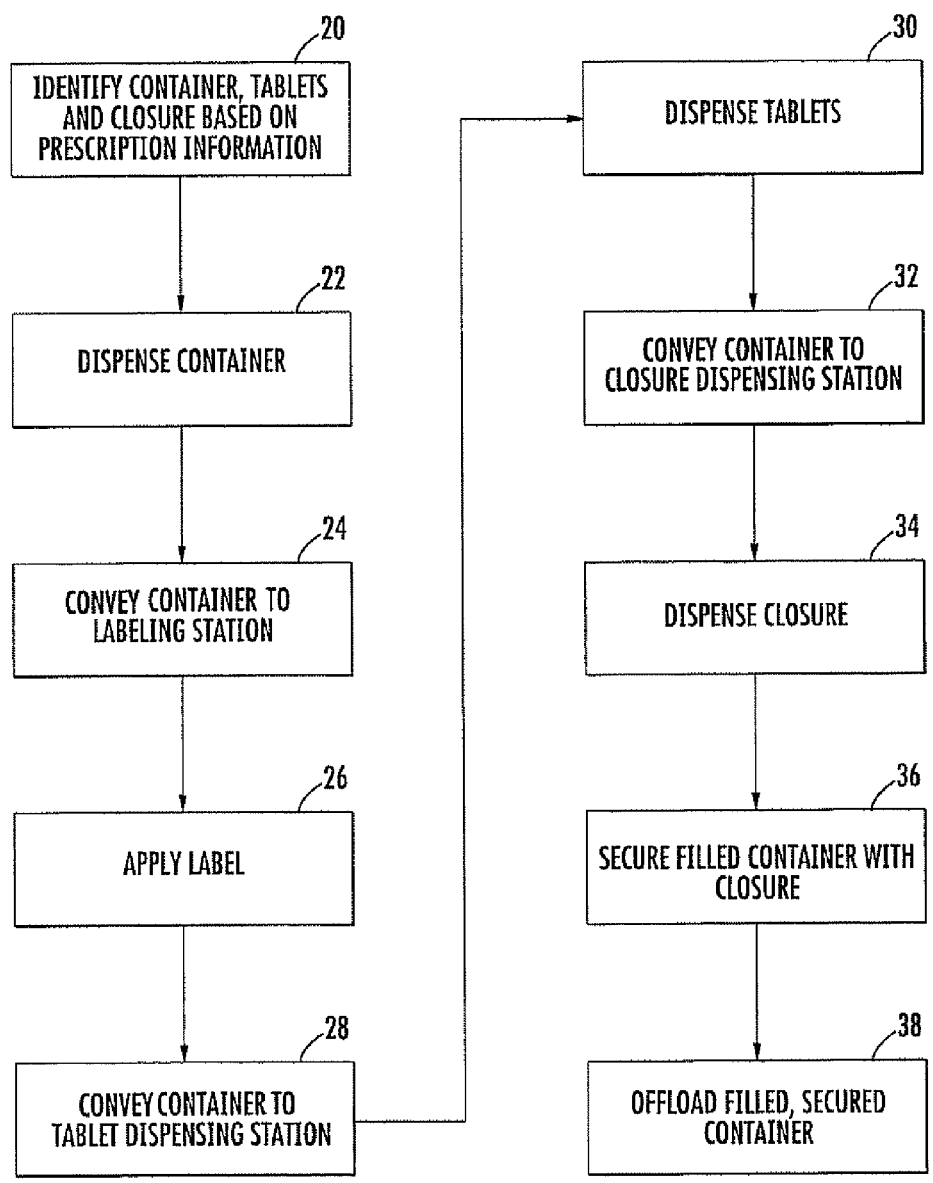
FIG. 1 is a flow chart illustrating an embodiment of a method according to the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" their are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As described above, the invention relates generally to a system and process for dispensing pharmaceuticals, and more specifically to the singulation and dispensing of caps or caps, within such a system. An exemplary overall process is described generally with reference to FIG. 1. The process begins with the identification of the proper container, tablets or capsules and caps to be dispensed based on a patient's prescription information (Box 20). A container of the proper size is dispensed at a container dispensing station (Box 22), then travels to a labeling station (Box 24). The labeling station applies a label (Box 26), after which the container travels to a tablet dispensing station (Box 28), from which the designated tablets are dispensed in the designated amount into the container (Box 30). The filled container is then moved to a cap dispensing station (Box 32), where a cap of the proper size has been dispensed (Box 34). The filled container is secured with a cap (Box 36), then transported to an offload station and offloaded (Box 38).

Figure 2:
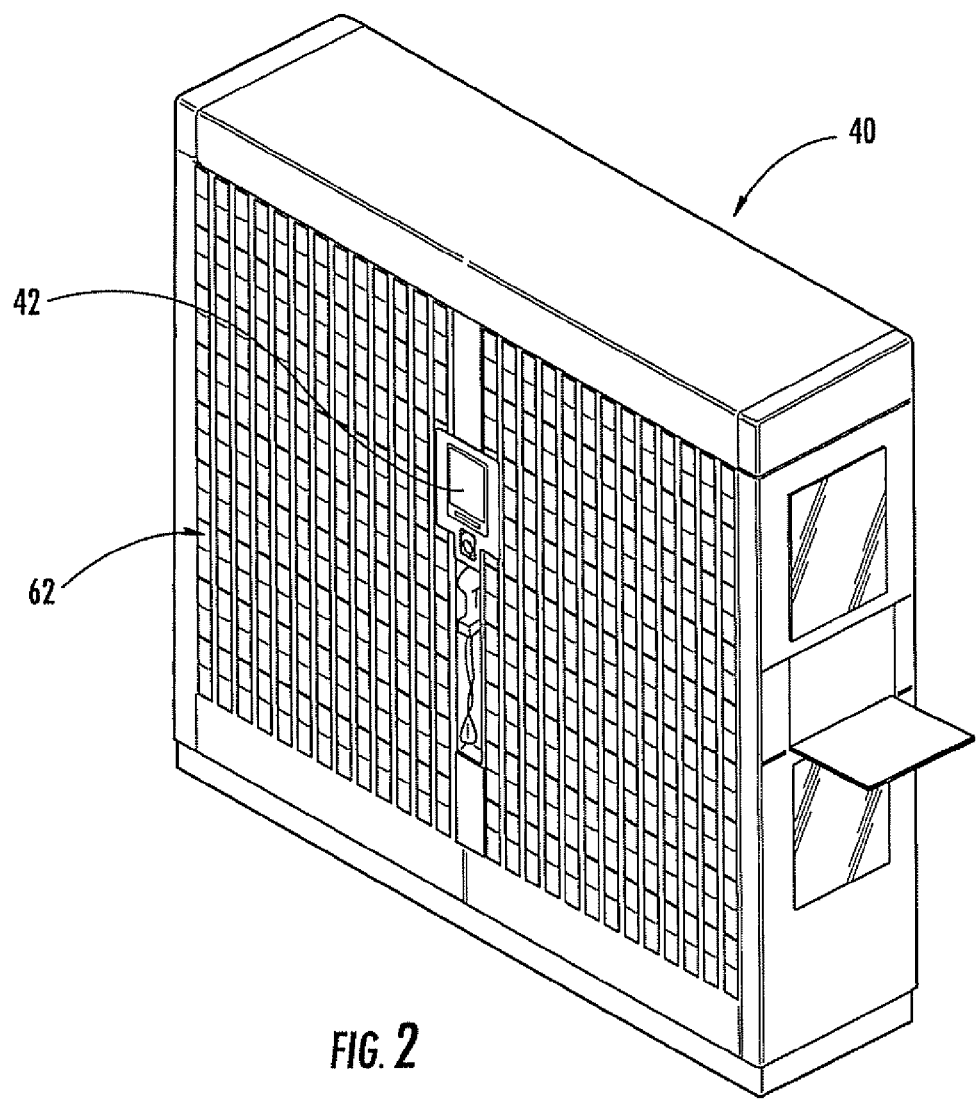
FIG. 2 is a front perspective view of a pharmaceutical tablet dispensing system according to the present invention.
Figure 3:
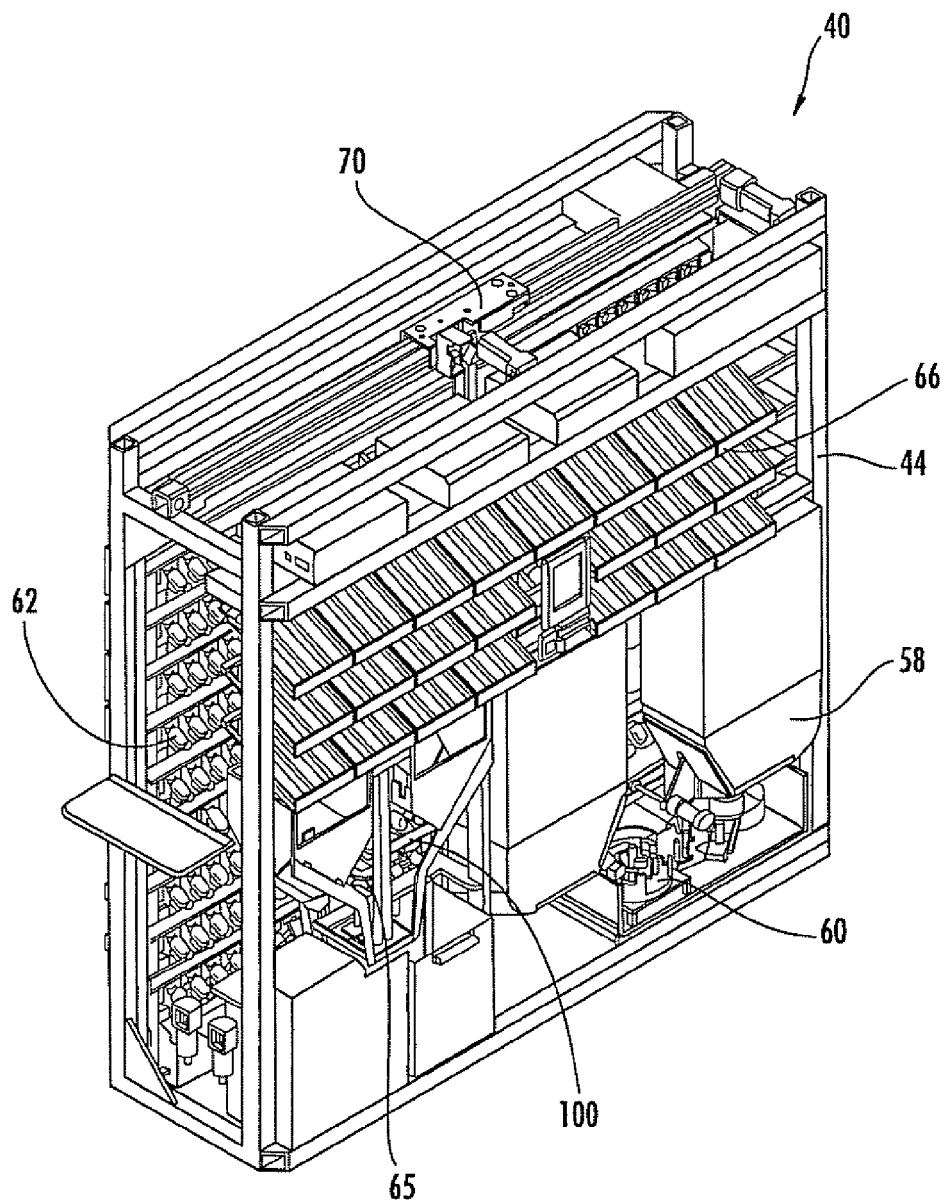
FIG. 3 is a rear cutaway perspective view of the system of FIG. 2 illustrating the support frame, the container dispensing station, the labeling station, the carrier, and the cap dispensing station.

A system that can carry out this process is illustrated in FIGS. 2 and 3 and designated broadly therein at 40. The system 40 includes a support frame 44 for the mounting of its various components. The system 40 generally includes as operative stations a controller (represented herein by a graphics user interface monitor 42), a container dispensing station 58, a labeling station 60, a tablet dispensing station 62, a cap dispensing station 100, a capping station 65, and an offloading station 66. In the illustrated embodiment, containers, tablets and caps are moved between these stations with a dispensing carrier 70; however, in some embodiments multiple carriers may be employed. With the exception of the cap dispensing station 100, which is described in detail below, examples of each of the other operative stations and the conveying devices are described in detail in U.S. Pat. No. 6,971,541 to Williams et al., U.S. patent application Ser. Nos. 11/599,526; 11/599,576; 11/755,249; and U.S. Provisional Patent Application Ser. No. 60/938,869, the disclosures of each of which are hereby incorporated herein in its entirety.

Figure 4:
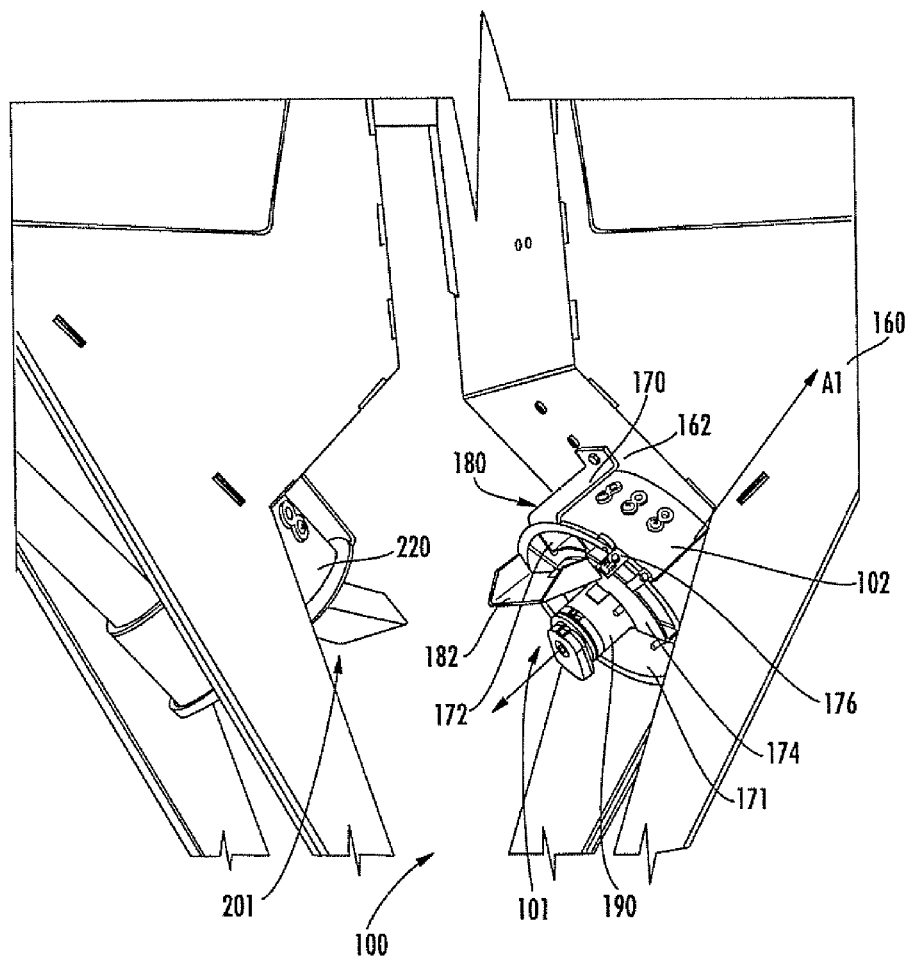
FIG. 4 is an enlarged rear perspective view of a cap dispensing station found in the system of FIG. 2.

Turning now to FIG. 4, the cap dispensing station 100 is illustrated therein. FIG. 4 shows a small cap dispenser 101 and a large cap dispenser 201. Each of the small and large cap dispensers 101, 201 includes an outer ring 102, a drum (designated at 120 in the small cap dispenser 101 (FIGS. 7 and 8) and 220 in the large cap dispenser 201 (FIG. 10)), a housing 160, and a mounting scaffold 170. The cap dispensing station 100 will initially be described below with respect to the small cap dispenser 101; subsequent discussion will describe differences in the small and large drums 120, 220 and accompanying differences in the small and large cap dispensers 101, 201.

Figure 5:
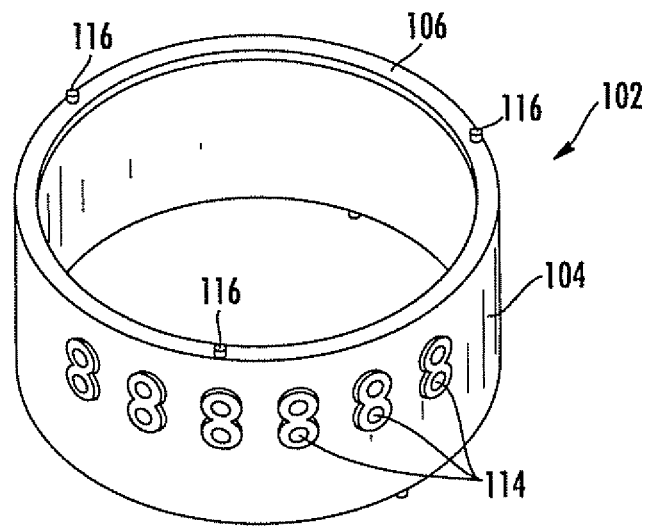
FIG. 5 is a top perspective view of the outer ring of the cap dispensing station of FIG. 4.
Figure 6:
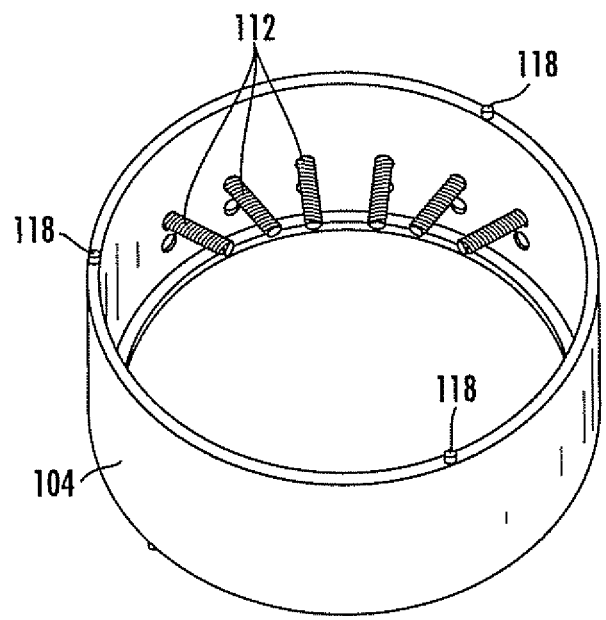
FIG. 6 is a bottom perspective view of the outer ring of FIG. 5.

Referring to FIGS. 5 and 6, the outer ring 102 is generally cylindrical and includes an outer wall 104. A lip 106 extends radially inwardly from the upper end of the wall 104. The wall 104 also includes a plurality of apertures 114 over a sector of approximately 90 degrees; the apertures 114 are aligned in upper and lower rows. At its lower edge, the wall 104 includes three location tabs 118 that register the outer ring 102 relative to the mounting scaffold 170. The outer ring 102 also includes three location tabs 116 on its upper edge for registration of the housing 160.

The outer ring 102 is illustratively formed as a unitary member, although it can be made as separate components and subsequently assembled. It may be formed of a polymeric material, such as glass-filled ABS, or any number of other suitable materials.

A series of screws 112 is inserted into the lower row of apertures 114 (see FIG. 6). The screws 112 extend radially inwardly beyond the inner surface of the wall 104. In some embodiments, the screws 112 may be replaced with a horizontally disposed blade or similar panel that extends radially inwardly from the wall 104.

Figure 7:
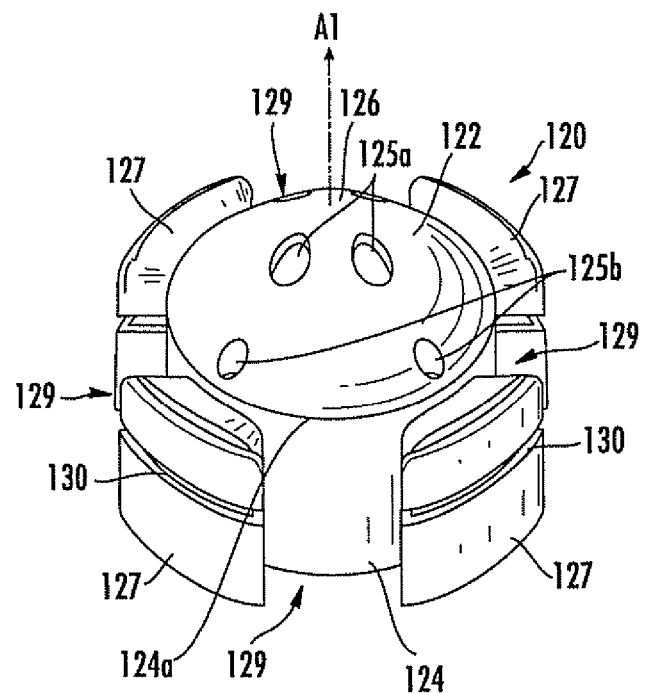
FIG. 7 is a top perspective view of the small drum of the cap dispensing station of FIG. 4.
Figure 8:
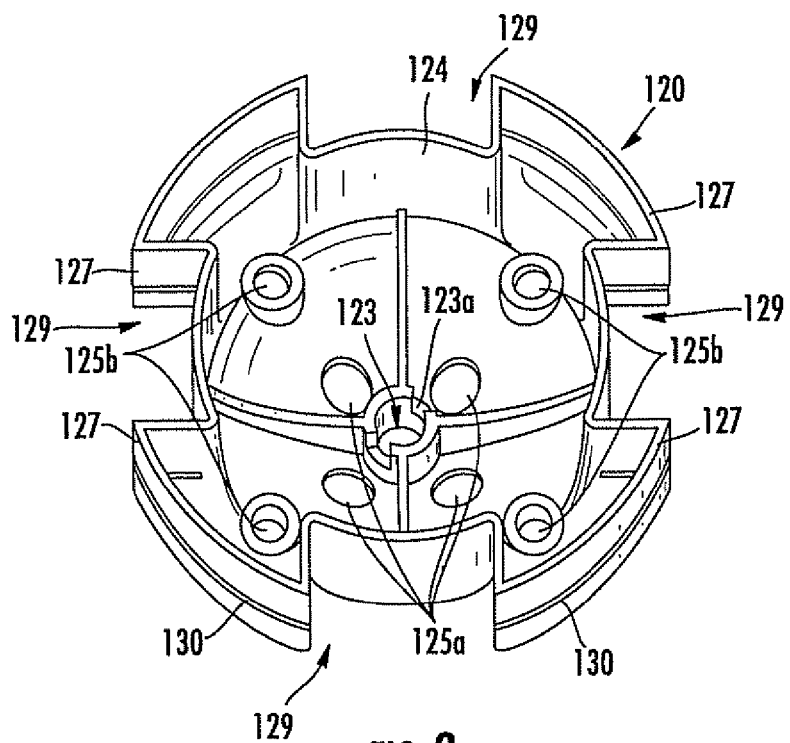
FIG. 8 is a bottom front perspective view of the small drum of FIG. 7.
Figure 11:
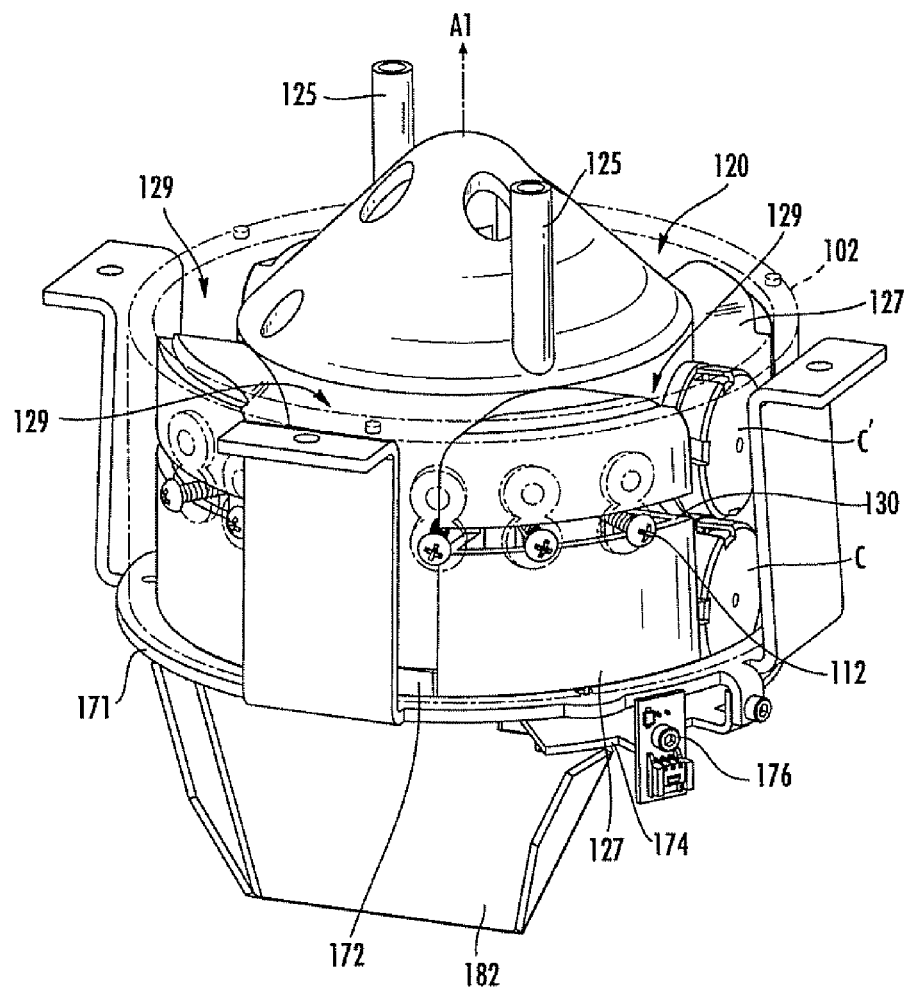
FIG. 11 is a front perspective view of the cap dispensing station of FIG. 4 showing a cap in the gap created between wings of the small drum.

Turning now to FIGS. 7 and 8, the small drum 120 has a hub 122 formed with a cylindrical vertical wall 124 and a snub-nosed cone 126 above and merging with the wall 124 at an edge 124a. A central axis A1 extends through the center of the cone 126 (FIG. 11). The cone 126 includes four assembly apertures 125a and four agitation finger holes 125b. The underside of the hub 122 has a bore 123 with a slot 123a for receiving the shaft of a motor 190 (see FIG. 4) aligned on the axis A1. Four circumferentially equally spaced wings 127 extend from the vertical wall 124; each of the wings 127 extends over a sector of approximately 45 degrees relative to the axis A1, thereby forming gaps 129 of approximately 45 degrees. A slot 130 extends circumferentially across each wing 127.

The small drum 120 is illustratively formed as a unitary member, although it can be made as separate components and subsequently assembled. It may be formed of a polymeric material, such as glass-filled ABS, or any number of other suitable materials.

Four agitation fingers 125c (see FIG. 9) are inserted into the agitation finger holes 125b and extend upwardly therefrom. The finger 125c may be formed of a resilient material, such as flexible rubber or plastic tubing. The fingers 125c are mounted in the holes 125b via push rivets (not shown) or the like.

Figure 9:
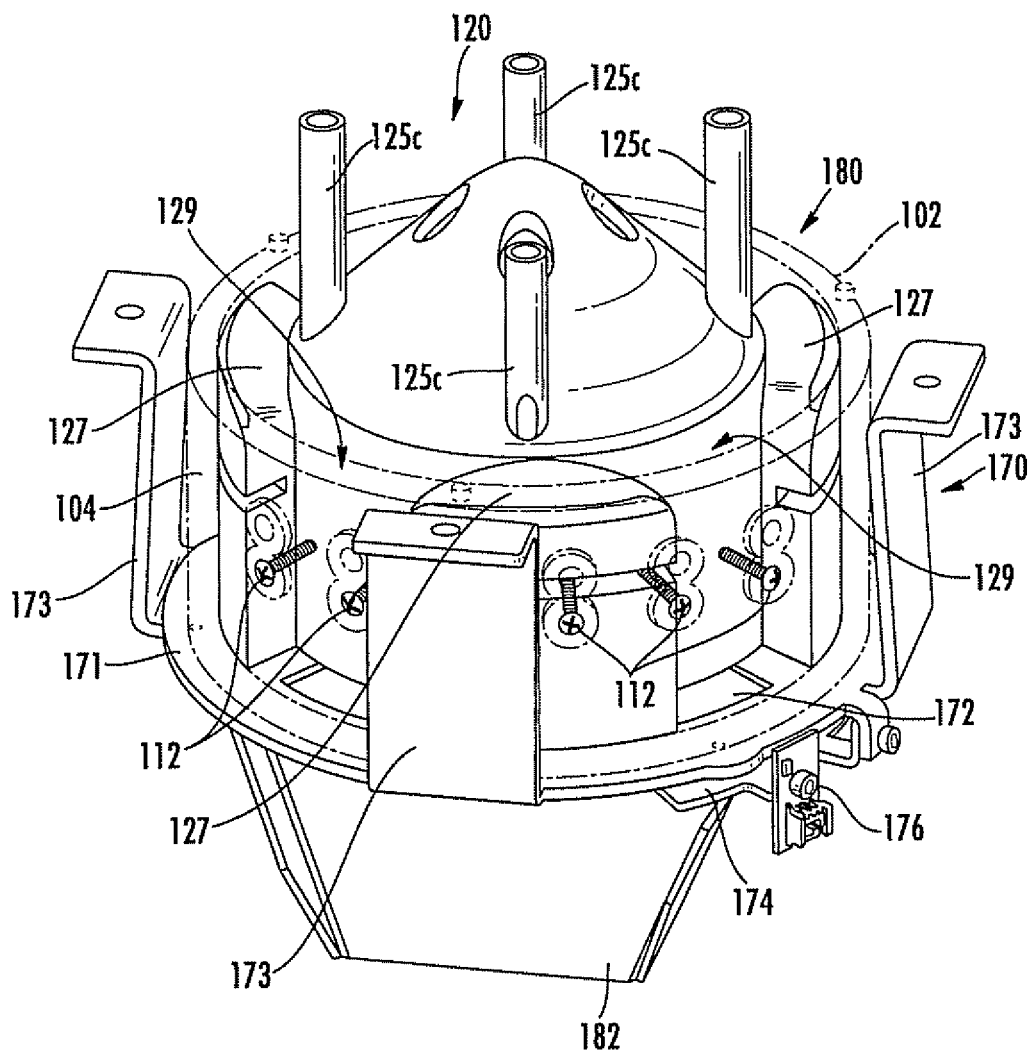
FIG. 9 is a top front perspective view of the small drum assembly of the cap dispensing station of FIG. 4.

The small drum 120 fits within the outer ring 102 such that the wings 127 are in adjacent but non-contacting relationship with the wall 104 (see FIG. 9). The screws 112 are positioned at a height that enables them to be received in one of the slots 130. Together, the small drum 120 and the outer ring 102 form a small drum assembly 180, in which the small drum 120 is able to rotate relative to the outer ring 102.

Turning back to FIG. 4, the housing 160 is hollow and is sized and configured to be positioned above and mate with the outer ring 102. As such, the housing 160 serves as a hopper for holding randomly distributed caps to be singulated. The housing 160 is fixed to the frame 44 and includes a lower end 162 that is open to provide caps to the small drum assembly 180. The lower end 162 mates with the tabs 116 on the outer ring 102.

Referring now to FIGS. 4 and 9, the mounting scaffold 170 includes a floor 171 and three legs 173. The floor 171 has an arcuate exit aperture 172 that is located above and extends for approximately 90 degrees about the axis A1. A pre-staging platform 174 is positioned below a portion of the exit aperture 172. A proximity sensor 176 connected to the controller 42 is mounted adjacent the pre-staging platform 174. The mounting scaffold 170 is mounted to the frame 44 such that the floor 171 is disposed at an angle of between about 40 and 50 degrees to the underlying surface. The outer ring 102 is mounted around the small drum 120 and underneath the housing 160 within the mounting scaffold 170. The shaft of the motor 190 extends through the floor 171, and the small drum 120 is mounted to the shaft.

In operation, the cap dispensing station 100 is oriented as shown in FIG. 4. The housing 160 is filled with caps of a desired size. The controller 42 signals the cap dispensing station 100 to dispense a cap (for example, when a vial has been labeled and filled, or if it is desired to pre-stage a cap). Upon receiving the signal from the controller 42 to dispense a small cap, the motor 190 rotates the small drum 120 relative to the outer ring 102 about the axis A1 (rotation is clockwise from the vantage point of FIG. 9). As described in Williams '541, supra, rotation of the small drum 120 agitates the caps in the housing 160 (this agitation can be facilitated by the agitation fingers 125c). Eventually, a cap C descends from the housing 160 into one of the gaps 129 (see FIGS. 9 and 10). As explained in detail in Williams '541, the open-ended shape of the cap C, the width of the gap 129, and the arcuate shape of the edge 124a allow the cap C to enter any of the gaps 129 only in an orientation in which the open end of the cap C faces the edge 124a.

Once in the gap 129, as the small drum 120 rotates the cap C rolls or slides on the floor 171 until the cap C is positioned over the exit aperture 172, at which time the cap C descends through the exit aperture to the pre-staging platform 174, where it is pushed by its adjacent wing 127 to a position adjacent the sensor 176 (see FIG. 4). The sensor 176 then signals the controller 42 to cease the rotation of the small drum 120. At this point, the cap C is pre-staged and is ready to be dispensed to the next filled, labeled vial.

When the controller 42 receives a signal again that a cap C is needed, the controller 42 initiates rotation of the small drum 120, which rotation slides the pre-staged cap C to the end of the pre-staging platform 174 and into a chute 182 (FIGS. 4, 9 and 11) that conveys the cap C to the capping station 65, where the cap C is applied to the filled, labeled vial. The small drum 120 continues to rotate until another cap C has descended from the housing 160 into the gap 129 and been conveyed onto the pre-staging platform 174. In this manner the cap dispensing station 100 can immediately provide a cap C (i.e., a pre-staged cap) for the capping of a vial (thus not slowing the entire process practiced by the system 40 by waiting for the singulation of a cap), while singulating another cap C and pre-staging it for subsequent use.

Figure 12:
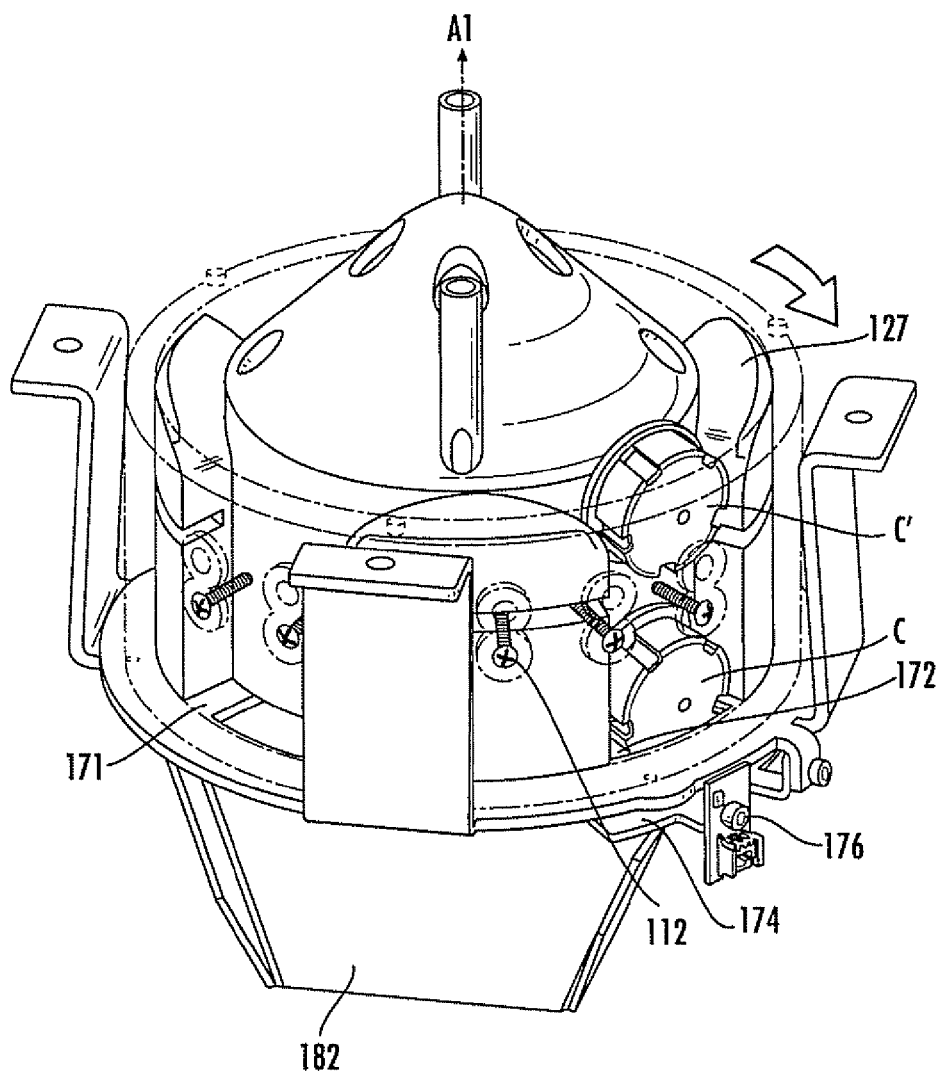
FIG. 12 is a front perspective view of the cap dispensing station of FIG. 4 showing the movement of one cap as it passes out of the small drum assembly and of a second stacked cap that is prevented from passing out of the small drum assembly.

Turning now to FIGS. 11 and 12, it can be seen that, as described above, on occasion two caps can become entangled at their edges, which can result in a stack of two caps residing in a gap 129. As the small drum 120 rotates and a gap 129 carrying a cap C reaches the exit aperture 172, the cap C passes under the screws 112. However if the cap C is entangled or interlocked with a second cap C'; the second cap C' passes above the screws 112, which prevent the second cap C' from following the first cap C into the exit aperture 172 and down the chute 182. Once the gap 129 has rotated past the screws 112, the second cap C' is free to remain in the gap 129 or to return to the randomly distributed caps in the hopper 160. Thus, the screws 112 serve as separating structure to separate the upper cap C' from the lower cap C.

Figure 10:
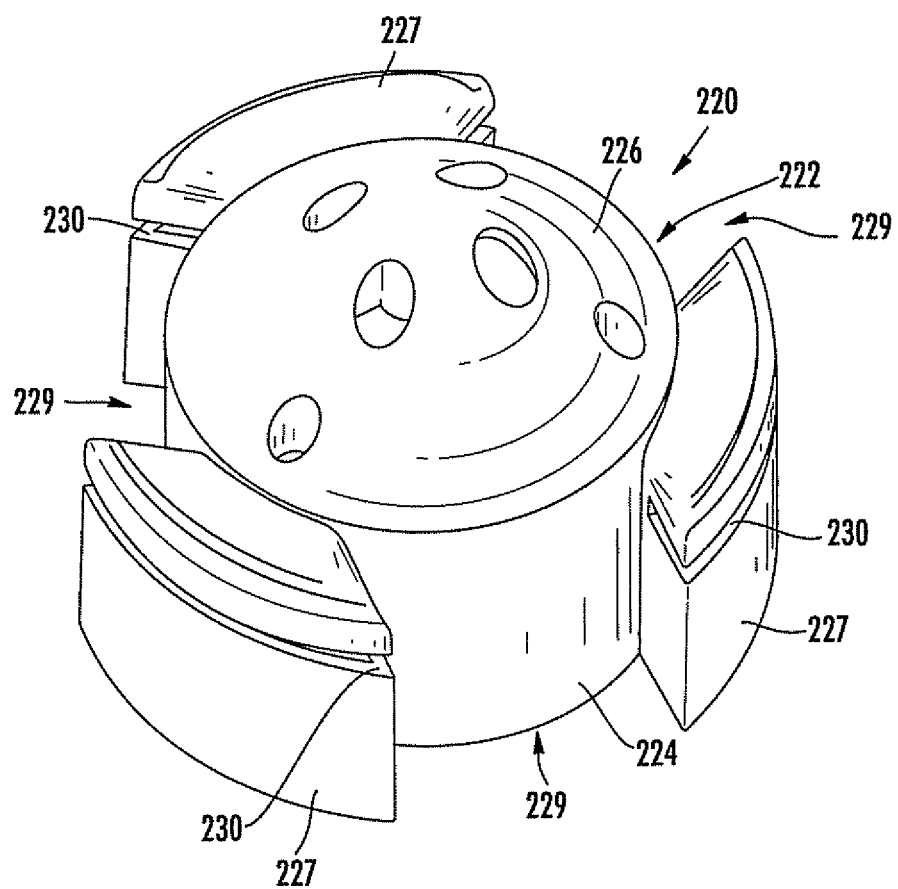
FIG. 10 is a perspective view of a large drum that can be used in the cap dispensing station of FIG. 4.

Turning now to FIG. 10, it can be seen that a large drum 220 can be substituted for the small drum 120 in the event singulation of caps of a different size are desired. Generally speaking, the small drum 120 (which has gaps 129, measured from the pre-staging platform 174 to the screws 112, with a height of between about 1.9 and 2.2 inches and a width, measured from the ID of the outer ring 102 to the OD of the drum wall 124, of about 0.4 to 0.75 inches) may be used for caps of 1.15 to 1.90 inch diameter, while the large drum 220 (which has gaps 229 with a height of between about 2.3 and 2.6 inches and a width of about 0.5 to 0.8 inches) may be used for caps of 2.0 to 2.4 inch diameter. The large drum 220 is similar in configuration to the small drum 120, having a hub 222 formed of a vertical wall 224 and a cone 226; however, the large drum 220 includes only three wings 227 that form tree gaps 229, and slots 230 are positioned nearer the cone 226 than is the case for the small drum 120. Also, when the large drum 220 is inserted into the outer ring 102 to form a large drum assembly, the screws 212 or other separating structure are inserted into the upper row of apertures 114 to position them properly for receipt in the slots 230.

Thus, it can be seen that, by having two different rows of apertures 114 in the wall 104, the same size outer ring 102 can be employed with either the small drum 120 or the large drum 220. As a result, manufacturing of the cap dispensing station 100 can be simplified.

Those skilled in this art will appreciate that the device may be suitable for the singulation and dispensing of other open-ended objects. For example, the device could dispense and singulate lids for jars, bottles or cans, bowls, ashtrays, or the like.

Those skilled in this art will recognize that other configurations may also be suitable. For example, the drum may include more or fewer wings depending on the object being singulated. Some other configuration or technique for ensuring that the open-ended object is oriented with its open end facing the hub may also be used, or for some objects the orientation may not be critical. Some embodiments may not include prestaging capability, or they may prestage more than one object at a time. Other possible alternatives will be recognizable to those skilled in this art.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A device for singulating open-ended objects, the device comprising:
    a housing configured to retain a plurality of open-ended objects, the housing having an open lower end;
    an outer ring positioned below the housing;
    a drum positioned within the outer ring to form a drum assembly, the drum including a hub having a substantially circular wall and a plurality of wings that extend radially outwardly from the wall toward the outer ring, the hub, wings and outer ring forming a plurality of gaps;
    a mounting structure with an exit aperture fixed relative to the housing; and
    a rotary drive unit mounted to the drum that rotates the drum about an axis of rotation;
    wherein the mounting structure further comprises a pre-staging station fixed relative to the housing and positioned below the exit aperture, and wherein the pre-staging station is positioned such that the dispensing of an object from the gap through the exit aperture causes the object to reside in the pre-staging station;
    wherein the pre-staging station is positioned a distance below the exit aperture such that an object residing in the pre-staging station has a portion that extends above the exit aperture and a portion that extends below the exit aperture.

2. The device defined in claim 1, wherein the drum assembly is mounted such that the axis of rotation forms an angle of between about 40 and 50 degrees relative to horizontal.

3. The device defined in claim 1, wherein the drum includes a generally cone-shaped section that is positioned above the wall of the hub.

4. The device defined in claim 1, wherein the drum assembly further includes at least one agitation finger that extends from the hub.

5. The device defined in claim 1, wherein the outer ring includes a radially inwardly-extending rim, the rim being sized so that an open-ended object of a predetermined size is able to enter one of the gaps if the open end of the object is facing the hub, but is unable to enter any of the gaps if the closed end of the object is facing the hub.

6. The device defined in claim 1, wherein the mounting structure is a mounting scaffold within which the outer ring resides.

7. The device defined in claim 1, further comprising a separating structure mounted on the outer ring and positioned above the exit aperture at a height selected to enable a first object to pass beneath the separating structure and drop through the exit aperture but prevent a second object from dropping through the exit aperture.

8. The device defined in claim 7, wherein the separating structure comprises one of a plurality of screws and a separating blade.

9. The device defined in claim 7, wherein the wings include generally horizontal slots, and wherein the separating structure is positioned to extend into the horizontal slot of a wing positioned adjacent the separating structure as the drum rotates.

10. A device for singulating round open-ended objects, the device comprising:
    a housing configured to retain a plurality of round open-ended objects, the housing having an open lower end;
    an outer ring positioned below the housing;
    a drum positioned within the outer ring to form a drum assembly, the drum including a hub having a substantially circular wall, the hub and outer ring forming at least one gap therebetween;
    a mounting structure fixed relative to the housing, the mounting structure including a floor with an exit aperture defined therein;
    a rotary drive unit mounted to the drum that rotates the drum about an axis of rotation; and
    a separating structure fixedly mounted to the outer ring and positioned above the exit aperture at a height selected such that, as the drum rotates, a first round object can pass beneath the separating structure and drop through the exit aperture as a second round object positioned above the first round object passes above the separating structure, thereby preventing the second round object from dropping through the exit aperture;
    wherein the mounting structure further comprises a pre-staging platform fixed relative to the housing and positioned below the exit aperture, and wherein the pre-staging station is positioned such that the dispensing of an object from the gap through the exit aperture causes the object to reside in the pre-staging station;
    wherein the pre-staging station is positioned a distance below the exit aperture such that an object residing in the pre-staging station has a portion that extends above the exit aperture and a portion that extends below the exit aperture.

11. The device defined in claim 10, wherein the drum assembly is mounted such that the axis of rotation forms an angle of between about 40 and 50 degrees relative to horizontal.

12. The device defined in claim 10, wherein the drum includes a generally cone-shaped section that is positioned above the wall of the hub.

13. The device defined in claim 10, wherein the drum assembly further includes at least one agitation finger that extends from the hub.

14. The device defined in claim 10, wherein the outer ring includes a radially inwardly-extending rim, the rim being sized so that an open-ended object of a predetermined size is able to enter the gap if the open end of the object is facing the hub, but is unable to enter the gap if the closed end of the object is facing the hub.

15. A method of singulating round open-ended objects residing in a housing, comprising the steps of:
providing a drum assembly comprising an outer ring positioned below the housing and a rotatable drum positioned within the outer ring, the drum including a hub having a substantially circular wall, the hub and outer ring forming at least one gap therebetween, the drum assembly further including a separation structure fixedly mounted on the outer ring and extending radially inwardly, the separation structure being positioned such that, as the drum rotates, a first round object can pass below the separation structure as a second round object positioned above the first round object passes above the separation structure, the drum assembly being mounted on a mounting structure having a floor with an exit aperture defined therein;
feeding the drum assembly with round objects; and
rotating the drum about an axis of rotation such that a round object drops into a gap and passes below the separation structure and into the exit aperture;
wherein, upon exiting the drum assembly, the object is received on a pre-staging platform positioned below the exit aperture, wherein the pre-staging station is positioned such that the dispensing of an object from the gap through the exit aperture causes the object to reside in the pre-staging station, and wherein the pre-staging station is positioned a distance below the exit aperture such that an object residing in the pre-staging station has a portion that extends above the exit aperture and a portion that extends below the exit aperture.

16. The method defined in claim 15, wherein the objects have a diameter of between about 1.15 and 1.90 inches.

17. The method defined in claim 16, wherein the distance between the separation structure and the prestaging platform is between about 1.9 and 2.2 inches in height.

18. The method defined in claim 15, wherein the objects have a diameter of between about 2.0 and 2.4 inches.

19. The method defined in claim 18, wherein the distance between the separation structure and the floor is between about 2.3 and 2.6 inches in height.

20. The method defined in claim 15, wherein the axis of rotation is between about 40 and 50 degrees relative to horizontal.

21. The method defined in claim 15, wherein the object on the pre-staging platform is a first object, and wherein repeating the rotating step causes a second object to exit a gap onto the pre-staging platform and the first object to drop from the pre-staging platform.

22. The method defined in claim 15, wherein the objects are caps for pharmaceutical vials.

* * * * *